Figure 1:
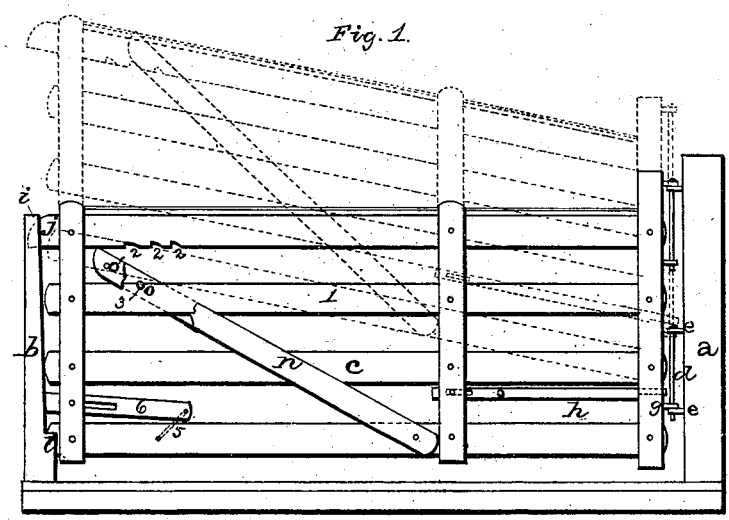
Figure 2:
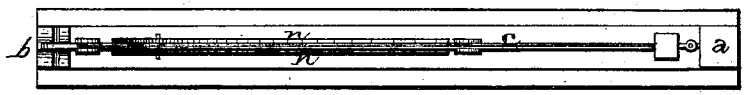
Figure 3:
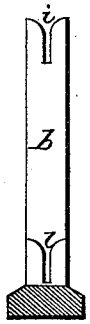

H. W. GOODWIN.
GATE.

No. 191,334. Patented May 29, 1877.

WITNESSES:

INVENTOR:

UNITED STATES PATENT OFFICE.

HILAND W. GOODWIN, OF IONIA, MICHIGAN.

IMPROVEMENT IN GATES.

Specification forming part of Letters Patent No. 191,334, dated May 29, 1877; application filed April 3, 1877.

*To all whom it may concern:*

Be it known that I, HILAND W. GOODWIN, of Ionia, in the county of Ionia and State of Michigan, have invented certain new and useful Improvements in Gates; and I do hereby declare the following to be a full, clear, and exact description of the invention, such as will enable others skilled in the art to which it pertains to make and use it, reference being had to the accompanying drawings, which form part of this specification.

My invention relates to an improvement in gates; and it consists in the arrangement and combination of parts that will be more fully described hereinafter, whereby the gate is prevented from sagging down, and can be raised vertically upward on its hinges to allow small animals to pass underneath.

The accompanying drawings represent my invention.

$a\ b$ represent the two gate-posts, and $c$ the gate. To the post $a$ is secured the vertical rod $d$ by means of the two eyebolts $e$, and to the gate is fastened an eyebolt, $g$, which plays up and down upon the rod as the gate is raised and lowered. At the top of the post and gate is another similar arrangement of eyebolts and a rod; but the rod is here attached to the gate instead of to the post.

By means of such hinges the gate can be raised and lowered vertically to any desired degree, and by attaching one hinge to the gate and one to the post they are made to counterbalance each other, and to counteract any disposition of the gate to sag down.

When the gate is raised vertically above the ground as far as the hinges will allow, by pushing out the slide $h$ its outer end catches on top of the lower rod $d$ and eyebolt $g$, and thus supports the gate in this position, allowing small animals to pass freely under it. While in this elevated position the gate may be swung as freely open as though turning on its hinges alone.

The post $b$ has a notch, $i$, in its top, in which the projecting panel $j$ catches, and in its inner side, at its base, is made another similar notch, $l$, into which the projecting end of the lower panel sinks when the gate is closed. The gate being thus held at both top and bottom, it cannot be unfastened by hogs rooting under it, but must be lifted either vertically on its hinges, or the brace or strut $n$ unfastened.

This brace consists of two slats that extend up, one on each side of the gate, as shown, and have their upper ends fastened rigidly together by means of the two bolts $o\ o'$. The upper bolt $o'$ catches in the notches 2 in the lower edge of the top panel, while the bolt $o$ catches in a notch, 3, in the top edge of the second panel 1. When the end of the gate is raised upward at the post $b$ the bolt $o'$ catches in the notches and holds the gate in this elevated position. The bolt $o$ catching in the notch 3 locks the gate so that its end cannot be raised upward, and while locked the gate can only be opened by lifting it vertically on its hinges until the two ends of the panels are free from the notches in the post.

By raising the brace until the notch no longer holds the bolt, the end of the gate can be easily raised upward.

Upon the top of the gate is placed a wire or wires, to which barbs are to be fastened, so as to prevent persons from climbing over the gate.

To the lower panel is fastened, by means of the rod, loop, or wire 5, the slotted catch 6, which can be pushed far enough outward to catch in the notch $i$, and hold the gate closed while its end is raised, as shown.

Having thus described my invention, I claim—

1. The combination of the gate $c$, strut $n$, hinges that allow the gate to be raised vertically upward, and the catch 6 for catching in the notch $i$ in the top of the post $b$ when the end of the gate is raised upward, substantially as shown.

2. The gate $c$, provided with the strut $n$ and hinges $d\ e\ g$, in combination with slide $h$ for catching over the top of the lower hinge, and supporting the gate in an elevated position, substantially as set forth.

In testimony that I claim the foregoing I have hereunto set my hand this 23d day of March, 1877.

HILAND W. GOODWIN.

Witnesses:
ALEX. W. DODGE,
WM. B. THOMAS.